Sept. 5, 1939. C. J. THATCHER Re. 21,203

PIPED AIR CONDITIONING AND HEATING SYSTEM

Original Filed March 21, 1936 2 Sheets-Sheet 1

INVENTOR.
CHARLES J. THATCHER
BY Barlow, Eggers, Sears & Neal
ATTORNEYS

Sept. 5, 1939. C. J. THATCHER Re. 21,203

PIPED AIR CONDITIONING AND HEATING SYSTEM

Original Filed March 21, 1936 2 Sheets-Sheet 2

INVENTOR.
CHARLES J. THATCHER

BY Bostwick, Eg... Sutherland
ATTORNEYS

Reissued Sept. 5, 1939

Re. 21,203

UNITED STATES PATENT OFFICE 21,203

PIPED AIR-CONDITIONING AND HEATING SYSTEM

Charles J. Thatcher, New York, N. Y.

Original No. 2,078,295, dated April 27, 1937, Serial No. 70,019, March 21, 1936. Application for reissue March 29, 1938, Serial No. 198,704

32 Claims. (Cl. 257—8)

Figure 1:
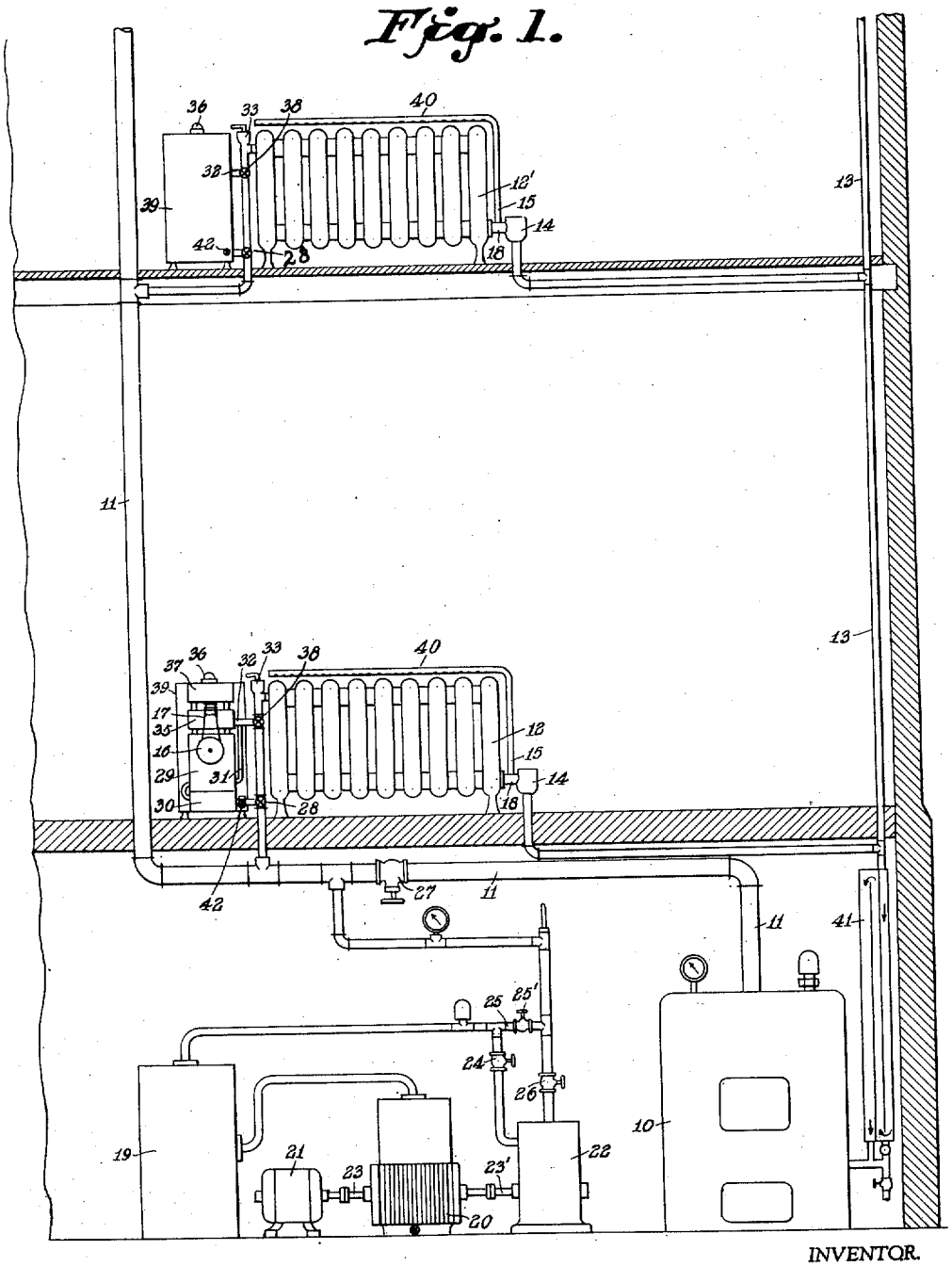

This invention relates to a heat-exchange system designed to control the temperature of enclosed air spaces, and more particularly to a central heating system through pipes, which, by valve manipulation, may be temporarily converted into a cooling and general air-conditioning system for the atmosphere of rooms whenever climatic conditions make such conversion desirable.

The invention is concerned more especially with steam and hot-water heating equipment which is already installed, for example in existing large buildings such as hotels, office buildings, and larger residences. In such structures the problem of either or both cooling and dehumidifying the air in warm weather does not admit of practical solution by the installation in the walls of the structure of cold-air ducts, new lines of pipes, etc. Such installations are prohibitively expensive and troublesome in the case of existing structures. Moreover, the conduction of the usual gaseous or highly volatile refrigerants through the existing pipe lines is not feasible, and is beginning to be generally prohibited by municipal ordinances because of the dangers involved. Objections to the use of cold liquids are well known.

Experience has shown also that the cooling of a large number of rooms in such buildings during the usual short season of warm weather—i. e., from June to September—by installing self-contained cabinet units for air-conditioning in each room is not economically practicable. For, when there is added to the original high purchase price of such units, the cost of connections of each unit to power lines, drainage systems, fresh-air intakes, etc., plus the cost of more or less constant servicing by licensed operators of a large number of such complicated units, the total expense of widespread summer comfort cooling in this way is far more than the general public will pay.

There is, therefore, no known system by which all, or any desired substantial proportion, of the many rooms in large existing structures can be equipped for air-conditioning in warm weather except at prohibitive expense.

In order to bring the installation cost of a system for general air-conditioning of large structures down to feasible limits, it appears to be necessary to combine it with the existing heating system; and no refrigerant other than compressed air for the reasons above stated is safe or permitted for use therein. Although this medium is less efficient than other refrigerants, it has been found that by the improvements of this invention the higher power cost is much more than offset by the diminished cost and facility of installation of suitable equipment, and the consequent greatly reduced amortization and interest charges.

The present invention has for an object, therefore, the provision of a means for so supplementing already installed heating systems, at a low initial cost, that the same may be employed during the warm season of the year to cool, filter and dehumidify the atmosphere of rooms on those days when climatic conditions make such air-conditioning desirable.

A further object of the invention is to make it practicable and economical to use compressed air as the refrigerant in air-conditioning the rooms of structures of the class specified.

Another object of the invention is the provision of apparatus of a rugged and simple character, the installation of which may be accomplished with a minimum of labor and alterations of existing heating installations, and without necessitating, in any way, the marring of walls and floors.

Still another object of the invention is to make use, when desirable, of the usual radiators or heat interchange units and the connected pipe lines of an existing heating system for the disposal of condensed water resulting from dehumidification, and also to eliminate condensation of water vapor and frosting on the conducting pipes between compressor and radiating units or on the units themselves.

In carrying out the invention, an air compressor is associated with the usual type of steam or hot-water heating systems. These systems invariably include a plurality of variously disposed heat exchange units and a central remote heating plant connected by pipe lines therewith. In accordance with the present invention, an air-compressor is installed at or near such central heating plant and is arranged to be connected to the pipe lines of the heating plant so as to convey compressed air instead of steam, when desired, to the desired heat-exchange units. The heat of compression may first be removed thereat, as by partial adiabatic expansion, approximately to the temperature of the ambient air; and then, contrary to prior proposals, the major expansion and refrigeration is delayed to the actual point of use. Since this compressed air may thus be conveyed through the pipe lines at atmospheric or higher temperatures, no condensation of moisture from the air surrounding such connecting pipe lines can occur on the pipes, nor can any frosting occur thereon.

To this end, individual, small expansion elements are associated with the respective heat-exchange units or radiators for cooling the compressed air to the desired point, by adiabatic expansion, for eventual delivery into a radiator. Just prior to or at the point of such delivery, however, the chilled air is mixed with an appreciably greater proportion of the ambient warm and humid air to be cooled, the chilled mixture being then introduced into a radiator, where excess moisture is condensed and deposited.

By this novel expedient, condensation of the water vapor contained in the humid, warm air of rooms is restricted to the interior of already installed radiators; and from these the resulting water is subsequently discharged through the return pipes in the usual manner and by the expedients provided for this purpose in such heating systems. The air thus conditioned is discharge from the radiator into the surrounding space; or it may first be directed downwardly over the unit, so as to bathe the exterior walls of the radiator with cooled, dried air to prevent condensation of moisture thereon.

Figure 2:
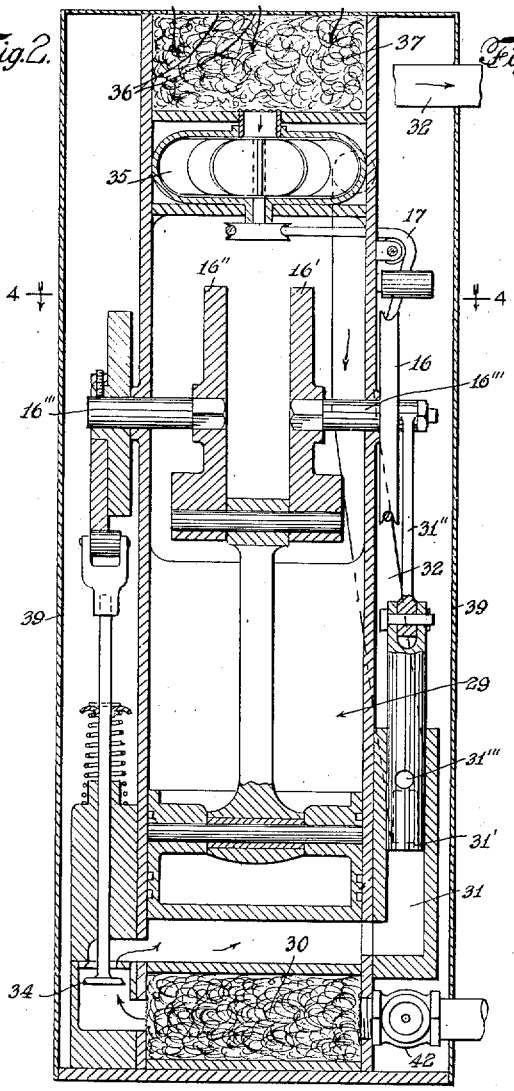
Figure 3:
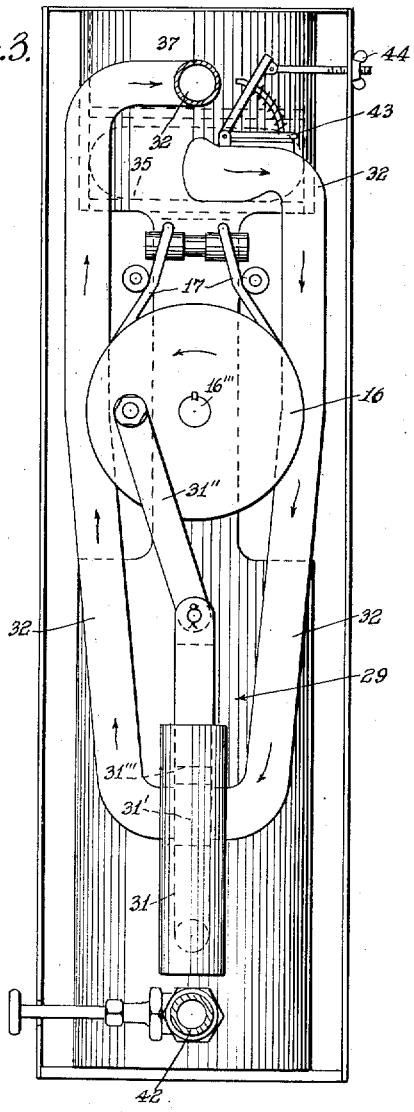
Figure 4:
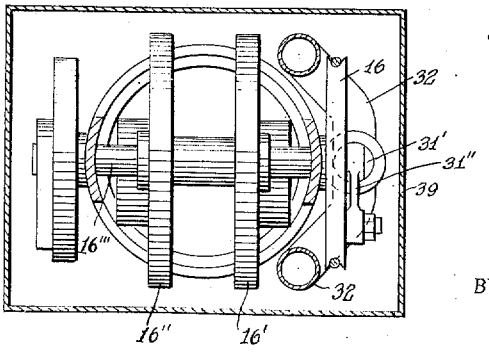
Figure 5:
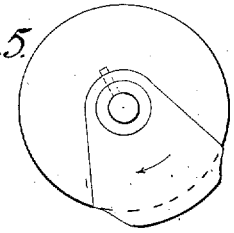

The accompanying drawing Fig. 1 shows, more or less diagrammatically, a standard heating installation modified in accordance with the invention so as to be convertible for cooling and general conditioning of air when climatic conditions make such change-over desirable. Fig. 2 is a transverse vertical section through the central plane of an expansion element and includes the blower, filters and other parts assembled therewith. Fig. 3 is an elevation of the assembled element showing the side adjacent to the radiator. Fig. 4 is a horizontal section on the line 4—4 of Fig. 2 looking in the direction of the arrows. Fig. 5 is a detail elevation of the cam wheel which actuates the inlet valve of the expansion element. As indicated, 10 designates a suitable boiler, for example, of a steam-heating system including the steam main 11 for delivering steam to various heat-exchange units or radiators 12, 12', etc., together with a return pipe 13 and the usual fittings and valves associated with such system including, in this particular embodiment, a sylphon valve 14 associated with each of the radiators to insure drainage of any water of condensation in a radiator.

In accordance with the invention, provision is made to disconnect or by-pass, temporarily, the boiler plant and associate with the remaining portion of the heating system an air-compressor plant. Thus, the said plant may comprise a compressor indicated at 20 provided with a fresh air intake line (not shown) and driven, for example, by an electric motor 21 or Diesel engine and discharging into a storage reservoir 19 and thence into a cooling device 22 for the compressed air. This device 22 may be designed to partially expand and thus cool the compressed air—only to approximately the temperature of the surrounding atmosphere—so that in its subsequent travel through the connecting pipes of the heating system, condensation of water vapor and/or frosting on the outside of these pipes will be obviated. This cooling may under some conditions be dispensed with and the warm compressed air be conducted through the pipe system. When needed, and in order to avoid excessive use of cold water, this cooling of the compressed air may conveniently be effected in well-known manner by utilizing either all or a fraction thereof for expanding within, and thus driving, an expansion engine illustrated by the cooling device 22 which serves also to help drive, for the sake of economy, the shaft 23, 23', of the motor 21 and the compressor 20.

A control valve 24 is provided in the connection between the compressor and the cooling device so that the latter may be cut off, if desired; and a by-pass connection 25 with control valve 25' is provided in case it should be desirable to operate the heating system temporarily with the heated compressed air rather than starting up the boiler plant. This arrangement may be of advantage in the tropics, or late in the spring and early fall in temperate climates, when moderate heating, for a few hours or so is needed, particularly of small buildings.

In the intended operation of the system for air-conditioning, however, the compressed air is delivered from its central source—as from the cooling device 22—by opening its discharge valve 26 to connect the same to the steam main 11 at a point beyond the closed shut-off valve 27 included therein. This compressed air, which, if desired, may have been cooled approximately to the temperature of the surrounding atmosphere, is conveyed by the steam main 11 to the different radiating or heat-exchange units; but it is not conveyed directly thereto as in the ordinary operation of the system for heating purposes. It is first directed to an expansion and mixer unit, hereinafter described; and a two-way valve 28 is provided in the radiator connection, the same being capable of closing the line to the radiator and of connecting the main solely with said expansion device. This device may be of any well-known or special design and is indicated at 29, Figs. 1 to 3. A filter 30 may be interposed, if desired, to intercept dust, scale and any other foreign matter which might pass through the main. In the said expansion device 29 the air is expanded and thus chilled to the desired degree, and is then conveyed by a short connection 31 and delivery pipe 32 to a radiator, there being interposed the usual control or modulating valve 33 for controlling the inlet into said radiator.

The invention includes the provision of means for introducing into a radiator, with this chilled air, of a relatively larger portion of the air which it is desired to cool and dehumidify. To this end, the expansion device 29 may be preferably of the mechanical type, and one in which all or part of the internal energy of the compressed air is used to drive an associated fan or blower device 35, coupled thereto and thereby caused to aspirate air from the surrounding room space or the external atmosphere through an inlet 36. The outlet of the blower is connected to the radiator 12, for example through the pipe 32, so that the chilled expanded air, together with the warm and humid air from the surrounding space, will be mixed while being delivered into the interior of the radiator 12, there being provided a two-way valve 38 in the radiator connection which is opened to the blower. In some instances it is desirable to interpose a filter for the room air aspirated into the blower, and such a filter 37 is indicated in the drawings as associated with blower 35. Moreover, for better appearance the entire expansion, blower and filter means may be encased in a suitably shaped housing 39, as is more clearly indicated in connection with the radiator 12'; the front panel of this housing is shown removed from the unit associated with radiator 12 in Fig. 1, and the side panel nearest the radiator is removed in Fig. 3.

Figs. 2 to 5 illustrate the details of a combined expansion, blower and filter unit differing in some particulars from that shown in Fig. 1. In this form, the fly-wheel comprises three sections, 16, 16′ and 16″. These sections are mounted separately, as shown, on the crank shaft 16‴; and the piston is connected to this crank shaft by a connecting rod, wrist-pin and fly-wheels, 16′ and 16″, which latter also serve as crank arms and are so weighted that the piston will stop, when the compressed air is shut off, at a point beyond dead center, and after it has started its expansion stroke. At this point the inlet valve 34 will still be open and the outlet valve 31′ will be closed. By this expedient the combined unit becomes self-starting upon re-admission of compressed air, since a force of several hundred pounds will be exerted upon the piston to start the expansion stroke thereof. The inlet valve 34 is so actuated by its cam, as shown in Figs. 2 and 5, that the compressed air supply is cut off during the completion of the expansion stroke, whereby the internal energy of the compressed air is used to perform the work required to drive the unit.

The outlet valve 31′ is so connected to the combined pulley and fly-wheel 16 through the link 31″ that both the pipe 31 from the expansion chamber and the delivery pipe 32 from the blower are closed during the expansion stroke; except that, if desired, a moderate volume of hot room air may pass at this time through a small channel 31‴ traversing the outlet valve 31′ as indicated therein, in order to sweep the mist from the preceding cycle through the exit leg of the pipe 32 into the radiator. If desired, some or all of the room air aspirated by the blower—particularly during the expansion stroke when its outlet is closed—can be allowed to escape through a suitable valve illustrated at 43 and which can be so regulated by the user, by adjustment of the nut 44, that the proportion of warm room air which passes through the pipe 32 into the radiator at each cycle is such as to give the desired temperature and humidity in the air of the room.

The blower 35 and the expansion device 29, or both, may be either rotary or reciprocating in type. If both are rotary they can be directly connected on a common shaft. As illustrated in the drawings Fig. 1 hereof there is shown only the fly wheel 16 of a reciprocating type of expansion engine 29, which may also serve as a pulley wheel and, together with the belt 17, drive a rotary blower as indicated.

By adiabatically expanding the compressed air and using its internal energy in the engine 29 to perform useful work as in driving the blower 35, the air issuing from the exhaust line 31 of the engine can be chilled to a temperature of minus 50° F. or even less. Consequently the connection pipes 31 and 32 may be made preferably of nonconducting material and as short as possible to avoid any undue condensation thereon; and the condensation resulting from the mixture of the very cold, chilled expanded air with the portion of the warm, moist air introduced into the radiator occurs entirely within the said radiator. The resulting water is removed from the radiator through the operation of the discharge valve 14.

The mixture of cooled air, which has been substantially freed from excess moisture, may then be discharged into the atmosphere surrounding the radiator through pipe 15. It is preferred, however, to provide over the top of the radiator one or more perforated discharge pipes 40 so arranged as to bathe the exterior walls of the radiator with cooled, dried air. This not only serves to prevent condensation of water vapor thereon, as a result of the interior cooling of the radiator, but can maintain a layer of cooled, dried air in the lower levels of the room, where it is particularly needed.

The exhaust pipe 15 leading from the outlet of a radiator or from the return line 18 of the heating system, should be of sufficiently large diameter to prevent undue back-pressure in the radiator and its inlet pipe 32; and said pipe 15 may branch out from the outlet pipe of a radiator between the radiator outlet and the thermostatic or other valve 14 customarily installed in the return line, as shown in the drawings. Where, as in most instances, this valve is of the "sylphon" or similar type which is closed thermostatically—i. e., when the temperature of low-pressure steam is attained—no change need be made in the valve or its connections, other than that just indicated. For, at the low temperatures employed in this system of cooling, the outlet of said valve will remain open and allow all water of condensation in the radiator to flow through the valve and the return line to the basement and thus to the drainage system.

However, in order to prevent flow of cold, dry air, also, through the said return line, a water trap should be installed therein at a convenient point or points, preferably in the basement, as indicated in the drawings at 41. If the depth of the water in this trap be sufficient, as can easily be arranged, then water will flow therethrough at all times; but the stream of cold, dry air from the radiator will at all times be diverted into and through the exhaust pipe 15 between the valve and the radiator.

The air-conditioning unit is placed in operative condition simply by manipulation of the two-way valves 28 and 38 so as to shunt the compressed air from the steam pipe into the air-conditioning unit. When the system is used for heating, with the two-way valves in the other position, then steam will flow in the usual manner directly into the heat-exchange unit, and entirely by-pass the air-conditioning unit.

A suitable valve 42 should be installed in the intake line to the expansion engine beyond the two-way valve 28, said valve being manipulated for the purpose of controlling the rate of flow of compressed air to the air-conditioning unit and, thereby, the temperature of the air issuing from the radiator into the room. This last-mentioned valve may be thermostatically controlled, if desired.

In order to supplement the ventilation of a room occasioned by the air infiltration through window cracks, doors, walls, etc., and that due to the expanded fresh air flowing through the pipes, the inlet 36 for room air may be connected by a conduit (not shown) with the external atmosphere. Such connection can readily extend through the customary form of adapter in the lower part of a window (not shown)—which is usually situated directly above each radiator in modern installations. By means of a damper at the fork of such a combined intake conduit for room and fresh air, the ratio of the two in the air stream flowing through the device can be controlled at will.

The extent of cooling and dehumidifying of the room air by the means disclosed herein may also be controlled by regulating, as by a throttle valve (not shown) on the inlet 36, the ratio of the volume of the air circulated by the blower to the volume of chilled air issuing from the expansion engine. Under ordinary conditions it may be said that four to ten times the volume of humid warm room or outside air should be mixed with one volume of chilled expanded air; and that the temperature of the air within the radiator resulting from this mixture should be below the desired room temperature sufficiently to condense water vapor in the mixture, and to keep the humidity of the room air at about 50% saturation, and its temperature within the desired limits. Since temperature and humidity vary so much from time to time, it is not possible to give any definite instructions, more than to say that the temperature of the mixture of aspirated room air and chilled air within the radiator may be 15° F., more or less, below the desired room temperature.

Under proper conditions, the compressed air flowing from the storage reservoir and/or the cooling device 22 will be free from oil vapor, or substantially so. However, when desirable, in order to prevent deposition of oil in the pipes of the heating system, a suitable oil filter (not shown) may be installed in the line, preferably in the basement of the structure or closely associated with the hereinbefore described centrally located air compressor and cooling device 22. If desirable, the main of the steam-heating system and the return line may be physically disconnected from the boiler during those seasons of the year when the heating system is to be used for cooling and general air-conditioning.

In place of the blower shown, an air injector (not shown) of any well-known type can be used to effect mixing of the humid warm room air with the chilled air from the expansion device 29. Under suitable conditions it is possible thus to aspirate and mix four to ten volumes of ambient warm air with one volume of chilled air issuing from the expansion device 29.

In general it may be said that the air should be compressed to 65 pounds gauge pressure or thereabouts in the centrally located air compressor 20, and may then be partially expanded in the cooling device 22 to about 50 pounds gauge pressure, which, under most conditions, will cool the air at that pressure to, or approximately to, atmospheric temperatures. The air at the said pressure and temperature is then conducted into and through the steam main, risers and piping of the heating system, as hereinbefore described. Of course, it will be realized that under many conditions it is not necessary to cool the compressed air down to atmospheric temperatures, and that the same could be piped through the building without cooling, except such as results from the passage of the compressed air through the piping system of the building.

With air at a pressure of 50 pounds at its inlet, the expansion device 29 should be so arranged that the air will expand therein to approximately zero pressure gauge, or to a few ounces positive pressure—just sufficient to force the expanded chilled air through the piping and radiators as hereinbefore described. When an air injector is used in place of a blower, the pressure drop in the expansion device should be such that the chilled air from the outlet thereof has a pressure of from 5 to 10 pounds gauge, or any pressure sufficient to aspirate the desired volume of external or room air by means of the jet of chilled air, as before described. Of course, these pressures can be modified as circumstances demand, and are cited only by way of illustration.

When it is desired to use the compressed air for heating, temporarily, the cooling device 22 will be by-passed altogether by suitable manipulation of the valves 24, 26, and 25' provided therefor; and the two-way valves 28 and 38 will be turned to a position which will by-pass the self-contained expansion unit associated with each radiator. In this way, the warm compressed air from the compressor 20 will circulate through the radiator and into the room and then afford a moderate degree of heating. This may be used very effectively in tropical or semi-tropical climates, particularly in small buildings, since it is there generally desirable to cool rooms 10° or so in the daytime and to heat them 10° or so during the evening, night and early morning hours.

Where, for the purpose of defining the character of the piping or "lines" of a steam or hot water heating system, the words "normal" or "normally" are employed in the claims of this application it is intended to comprehend the usual supply and return steam mains and risers and branch lines of piping, normally used or installed in either one-pipe or two-pipe systems to connect a centrally located steam or hot water plant to various rooms or radiators.

Where also for the purpose of defining the invention in the claims reference is made to conduction of compressed air or of water of condensation "through the said pipe line" or words to that effect, it is intended to comprehend such use of any portion of the risers, mains and/or pipes of a steam or hot water heating system, and not to imply that both the supply and return lines of a two-pipe system are necessarily used for the conduction of compressed air or of water of condensation; nor is it intended to imply that all of the lines in any steam or hot water system are necessarily used for either purpose.

It will be understood that modifications other than those herein described may be made without departing from the scope of my invention.

I claim:

1. In a heating system including a plurality of variously disposed hollow heat exchange units and a central heating plant normally connected therewith by a supply and return pipe line adapted to conduct steam or hot water from said plant to the said units and through the hollow channels thereof, the method of utilizing said system for air conditioning, which comprises compressing air at a central point, conducting it through said pipe line to the proximity of a heat exchange unit, there expanding the compressed air in such a way as to chill it, impelling the chilled air together with air to be conditioned into the said hollow channels of said unit to cool the mixture and deposit moisture therefrom, and discharging the conditioned air mixture from the said hollow channels of said unit into the room to be conditioned.

2. In a heating system including a plurality of variously disposed hollow heat exchange units and a central heating plant normally connected therewith by a supply and return pipe line adapted to conduct steam or hot water from said plant to the said units and through the hollow channels thereof, the method of utilizing said system for air conditioning which comprises compressing air at a central point, cooling the compressed air to approximately atmospheric temperature, conducting it through said pipe line to the proximity of a heat exchange unit, there expanding the compressed air in such a way as to chill it, impelling the chilled air together with air to be conditioned into the said hollow channels of said unit to cool the mixture and deposit moisture therefrom, and discharging the conditioned air mixture from the said hollow channels of said unit into the room to be conditioned.

3. In a heating system including a plurality of variously disposed hollow heat exchange units and a central heating plant normally connected therewith by a supply and return pipe line adapted to conduct steam or hot water from said plant to the said units and through the hollow channels thereof, the method of utilizing said system for air conditioning which comprises compressing air at a central point, conducting it through said pipe line to the proximity of a heat exchange unit, there expanding the compressed air in such a way as to chill it, impelling the chilled air together with air to be conditioned into the said hollow channels of said unit to cool the mixture and deposit moisture therefrom, draining the water of condensation from the unit through the said pipe line, and discharging the conditioned air mixture from the said hollow channels of said unit into the room to be conditioned.

4. In a heating system including a plurality of variously disposed hollow heat exchange units and a central heating plant normally connected therewith by a supply and return pipe line adapted to conduct steam or hot water from said plant to the said units and through the hollow channels thereof, the method of utilizing said system for air conditioning which comprises compressing air at a central point, conducting it through said pipe line to the proximity of a heat exchange unit, there expanding the compressed air in such a way as to chill it, impelling the chilled air together with air to be conditioned into the said hollow channels of said unit to cool the mixture and deposit moisture therefrom, and so discharging the conditioned air mixture from the said hollow channels of said unit as to bathe the exterior walls thereof with conditioned air.

5. In a heating system including a plurality of variously disposed hollow heat exchange units and a central heating plant normally connected therewith by a supply and return pipe line adapted to conduct steam or hot water from said plant to the said units and through the hollow channels thereof, the method of utilizing said system for air conditioning which comprises compressing air at a central point, cooling the compressed air to approximately atmospheric temperature, conducting it through said pipe line to the proximity of a heat exchange unit, there expanding the compressed air in such a way as to chill it, impelling the chilled air together with air to be conditioned into the said hollow channels of said unit to cool the mixture and deposit moisture therefrom, draining the water of condensation from the unit through the said pipe line, and so discharging the conditioned air mixture from the said hollow channels of said unit as to bathe the exterior walls thereof with conditioned air.

6. The combination with a heating system which includes a plurality of variously disposed hollow heat-exchange units and a central heating plant normally connected therewith by a supply and return line adapted to conduct steam or hot water between said plant and said units and through the hollow channels thereof, of means for utilizing said system for air conditioning, which comprise means for compressing air at a central point, means to conduct the compressed air through said pipe line to the proximity of a heat-exchange unit, an expansion element connected thereat to said pipe line and adapted to so expand the compressed air within the element as to chill it, means to impel the expanded chilled air together with air to be conditioned into the hollow channels of said unit to cool the mixture and deposit moisture therefrom, and means to discharge the conditioned air mixture from the said hollow channels of said unit into the room to be conditioned.

7. The combination with a heating system which includes a plurality of variously disposed hollow heat-exchange units and a central heating plant normally connected therewith by a supply and return line adapted to conduct steam or hot water between said plant and said units and through the hollow channels thereof, of means for utilizing said system for air conditioning, which comprise means for compressing air at a central point, means to conduct the compressed air cooled to approximate atmospheric temperature through said pipe line to the proximity of a heat-exchange unit, an expansion element connected thereat to said pipe line and adapted to so expand the compressed air within the element as to chill it, means to impel the expanded chilled air together with air to be conditioned into the hollow channels of said unit to cool the mixture and deposit moisture therefrom, and means to discharge the conditioned air mixture from the said hollow channels of said unit into the room to be conditioned.

8. The combination with a heating system which includes a plurality of variously disposed hollow heat-exchange units and a central heating plant normally connected therewith by a supply and return line adapted to conduct steam or hot water between said plant and said units and through the hollow channels thereof, of means for utilizing said system for air conditioning, which comprise means for compressing air at a central point, means to conduct the compressed air through said pipe line to the proximity of a heat-exchange unit, an expansion element connected thereat to said pipe line and adapted to so expand the compressed air within the element as to chill it, means to impel the expanded chilled air together with air to be conditioned into the hollow channels of said unit to cool the mixture and deposit moisture therefrom, means to drain the water of condensation from the unit through said pipe line, and means to discharge the conditioned air mixture from the said hollow channels of said unit into the room to be conditioned.

9. The combination with a heating system which includes a plurality of variously disposed hollow heat-exchange units and a central heating plant normally connected therewith by a supply and return line adapted to conduct steam or hot water between said plant and said units and through the hollow channels thereof, of means for utilizing said system for air conditioning, which comprise means for compressing air at a central point, means to conduct the compressed air through said pipe line to the proximity of a heat-exchange unit, an expansion element connected thereat to said pipe line and adapted to so expand the compressed air within the element as to chill it, means to impel the expanded chilled air together with air to be conditioned into the hollow channels of said unit to cool the mixture and deposit moisture therefrom, and means so to discharge the conditioned air mixture from the said hollow channels of said unit as to bathe the exterior walls of said unit with conditioned air.

10. The combination with a heating system which includes a plurality of variously disposed hollow heat-exchange units and a central heating plant normally connected therewith by a supply and return line adapted to conduct steam or hot water between said plant and said units and through the hollow channels thereof, of means for utilizing said system for air conditioning which comprise means for compressing air at a central point, means to conduct the compressed air cooled to approximate atmospheric temperature through said pipe line to the proximity of a heat-exchange unit, an expansion element connected thereat to said pipe line and adapted to so expand the compressed air within the element as to chill it, means to impel the expanded chilled air together with air to be conditioned into the hollow channels of said unit to cool the mixture and deposit moisture therefrom, means to drain the water of condensation from the unit through said pipe line, and means so to discharge the conditioned air mixture from the said hollow channels of said unit as to bathe the exterior walls of said unit with conditioned air.

11. The combination with a heat radiator provided with hollow channels adapted to hold steam or hot water and to be connected to a supply and return pipe line, of air conditioning means associated with said radiator, comprising an expansion element, means for supplying compressed air to the element for expansion therein to chill the expanded air, means for introducing the chilled air into the said hollow channels of the radiator together with air to be conditioned, and means to discharge the conditioned air mixture from the radiator.

12. The combination with a heat radiator provided with hollow channels adapted to hold steam or hot water and to be connected to a supply and return pipe line, of air conditioning means associated with said radiator, comprising an expansion element, means for supplying compressed air through said pipe line to the element for expansion therein to chill the expanded air, means for introducing the chilled air into the said hollow channels of the radiator together with air to be conditioned, and means to discharge the conditioned air mixture from the radiator.

13. The combination with a heat radiator provided with hollow channels adapted to hold steam or hot water and to be connected to a supply and return pipe line, of air-conditioning means associated with said radiator, comprising an expansion element, means for supplying compressed air to the element for expansion therein to chill the expanded air, means for introducing the chilled air into the said hollow channels of the radiator together with air to be conditioned, means to drain off water of condensation through said pipe line and to discharge the conditioned air mixture from the radiator.

14. The combination with a heat radiator provided with hollow channels adapted to hold steam or hot water and to be connected to a supply and return pipe line, of air-conditioning means associated with said radiator, comprising an expansion element, means for supplying compressed air to the element for expansion therein to chill the expanded air, means for introducing the chilled air into the said hollow channels of the radiator together with air to be conditioned, and means so to discharge the conditioned air mixture from the radiator as to bathe the exterior walls of the radiator therewith.

15. The combination with a heat radiator provided with hollow channels adapted to hold steam or hot water and to be connected to a supply and return pipe line, of air-conditioning means associated with said radiator, comprising an expansion element, means for supplying compressed air through said pipe line to the element for expansion therein to chill the expanded air, means for introducing the chilled air into the said hollow channels of the radiator together with air to be conditioned, means to drain off water of condensation through said pipe line and so to discharge the conditioned air mixture from the radiator as to bathe the exterior walls of the radiator therewith.

16. The combination with a heat radiator provided with channels adapted to hold steam or hot water, of means to cool, dehumidify, filter and circulate air and ventilate a room, which include means to compress air, means to expand the same to chill it, means employing the energy of expansion thereof to aspirate air to be conditioned through a filter and to impel the said air and chilled air together through said channels to cool the mixture and to condense and deposit moisture therefrom, means to drain the water of condensation from the radiator, and means to discharge the conditioned air mixture from the radiator.

17. The combination with a heat radiator provided with channels adapted to hold steam or hot water, of means to cool, dehumidify and circulate air, which include means to impel chilled air together with air to be conditioned through the said channels to cool the mixture and to condense and deposit moisture therefrom, and means to discharge the conditioned air mixture from the radiator.

18. The method of using a radiator provided with channels adapted to hold steam or hot water, to cool, dehumidify and circulate air, which includes impelling chilled air together with air to be conditioned through the said channels to cool the mixture and to condense and deposit moisture therefrom, and discharging the conditioned air mixture from the radiator.

19. In an air conditioning system, the combination with the normal piping of a steam or hot water system, of central means to supply compressed air to said piping, remote means to derive compressed air from said piping and so to expand said air as to chill it, means including a hollow channel within which to mix air to be conditioned with the expanded chilled air, and means to discharge the mixture into a room and to drain off water of condensation into said piping.

20. In an air conditioning system, the combination with the normal piping of a steam or hot water system, of central means to supply compressed air to said piping, remote means to derive compressed air from said piping and so to expand said air as to chill it, and means including a hollow channel within which to mix air to be conditioned with the expanded chilled air.

21. An all-the-year-round air conditioning system, including the normal piping of a steam or hot water heating system, means to supply a heated fluid thereto in colder weather, central means to supply compressed air to the normal piping of said system in warmer weather and means to withdraw and so to expand said air at a remote point as to lower the temperature of room air.

22. In a heating system including a plurality of variously disposed hollow heat exchange units and a central heating plant normally connected therewith by a supply and return pipe line adapted to conduct steam or hot water from said plant to the said units and through the hollow channels thereof, the method of utilizing said system for air conditioning which comprises compressing air at a central point, conducting it through said pipe line to the proximity of a heat exchange unit, there expanding the compressed air in such way as to chill it, and means employing the energy of expansion of the compressed air to impel a current of air through the said hollow channels for air conditioning purposes.

23. An all-the-year round air conditioning system, including the normal piping of a steam or hot water heating system, central means to supply a heated fluid to said piping in colder weather, central means to supply compressed air to said piping in warmer weather, and means remote from said last-named central means to withdraw and so to expand said compressed air as to lower the temperature and humidity of air to be conditioned.

24. An all-the-year round air conditioning system, including the normal piping of a steam or hot water heating system, central means to supply a heated fluid to said piping in colder weather, central means to supply compressed air to said piping in warmer weather, means remote from said last-named central means to withdraw and so to expand said compressed air as to lower the temperature and cause moisture to be condensed from air to be conditioned, and means to drain moisture condensed from the air into a pipe line of said system.

25. In an air conditioning system, the combination with the normal piping of a steam or hot water system leading to two or more remote rooms, of central means to supply compressed air to said piping, means in each of said rooms to deprive compressed air from said piping and so to expand said air as to chill it, means including a hollow channel within which to mix air to be conditioned with the expanded chilled air and to drain off water of condensation into said piping, and means to discharge the mixture into said rooms.

26. In a heating system including a plurality of variously disposed hollow heat exchange units and a central heating plant normally connected therewith by a supply and return pipe line adapted to conduct steam or hot water from said plant to the said units and through the hollow channels thereof, the method of utilizing said system for air-conditioning by cooling and dehumidifying room air, which comprises compressing air at a central point, conducting it through said pipe line to the proximity of a heat exchange unit, there expanding the compressed air in such a way as to chill it, impelling the chilled air together with room air to be conditioned into the said hollow channels of said unit to cool and dehumidify the mixture, draining the water of condensation from the unit through the said pipe line, and discharging the conditioned air mixture from the said hollow channels of said unit into the air of the room to be conditioned.

27. The combination with a heating system which includes a plurality of variously disposed hollow heat-exchange units and a central heating plant normally connected therewith by a supply and return line adapted to conduct steam or hot water between said plant and said units and through the hollow channels thereof, of means for utilizing said system for air-conditioning by cooling and dehumidifying room air, which comprise means for compressing air at a central point, means to conduct the compressed air through said pipe line to the proximity of a heat-exchange unit, an expansion element connected thereat to said pipe line and adapted to so expand the compressed air within the element as to chill it, means to impel the expanded chilled air together with room air to be conditioned into the hollow channels of said unit to cool and dehumidify the mixture, means to drain the water of condensation from the unit through said pipe line, and means to discharge the conditioned air mixture from the said hollow channels of said unit into the room to be conditioned.

28. The combination with a heating system which includes a plurality of variously disposed hollow heat-exchange units and a central heating plant normally connected therewith by a supply and return line adapted to conduct steam or hot water between said plant and said units and through the hollow channels thereof, of means for utilizing said system for air-conditioning by cooling and dehumidifying room air, which comprise means for compressing air at a central point, means to conduct the compressed air through said pipe line to the proximity of a heat-exchange unit, an expansion element connected thereat to said pipe line and adapted to so expand the compressed air within the element as to chill it, means to impel the expanded chilled air together with room air to be conditioned into the hollow channels of said unit to cool and dehumidify the mixture, and means to so discharge the conditioned air mixture from the said hollow channels of said unit as to bathe the exterior walls of said unit with conditioned air.

29. The combination with a heat radiator provided with hollow channels adapted to hold steam or hot water and connected to a supply and return pipe line, of air-conditioning means associated with said radiator, comprising an expansion element, means for supplying compressed air through said pipe line to the element for expansion therein to chill the expanded air, means for introducing the chilled air into the said hollow channels of the radiator together with room air to be conditioned, and means to discharge the conditioned air mixture from the radiator into said room.

30. The combination with a heat radiator provided with channels adapted to hold steam or hot water, of means to cool, dehumidify, filter, circulate and ventilate room air, which include means to compress fresh air, means to expand the same to chill it, means employing the energy of expansion thereof to aspirate room air through a filter and to impel the said room and chilled air together through said channels to cool the mixture and to condense and deposit moisture therefrom, means to drain the water of condensation from the radiator, and means to discharge the conditioned air mixture into the room.

31. The combination with a heat radiator provided with channels adapted to hold steam or hot water, of means to cool, dehumidify and circulate room air, which include means to impel chilled air together with room air through the said channels to cool the mixture and to condense and deposit moisture therefrom, and means to discharge the conditioned air mixture into the room.

32. The method of using a radiator provided with channels adapted to hold steam or hot water, to cool, dehumidify and circulate room air, which includes impelling chilled air together with room air through the said channels to cool the mixture and to condense and deposit moisture therefrom, and discharging the conditioned air mixture into the room.

CHARLES J. THATCHER.